(12) United States Patent
Liu et al.

(10) Patent No.: US 9,779,728 B2
(45) Date of Patent: Oct. 3, 2017

(54) SYSTEMS AND METHODS FOR ADDING PUNCTUATIONS BY DETECTING SILENCES IN A VOICE USING PLURALITY OF AGGREGATE WEIGHTS WHICH OBEY A LINEAR RELATIONSHIP

(71) Applicant: Tencent Technology (Shenzhen) Company Limited, Shenzhen (CN)

(72) Inventors: Haibo Liu, Shenzhen (CN); Eryu Wang, Shenzhen (CN); Xiang Zhang, Shenzhen (CN); Shuai Yue, Shenzhen (CN); Lu Li, Shenzhen (CN); Li Lu, Shenzhen (CN); Jian Liu, Shenzhen (CN); Bo Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 423 days.

(21) Appl. No.: 14/160,808

(22) Filed: Jan. 22, 2014

(65) Prior Publication Data
US 2014/0350939 A1 Nov. 27, 2014

Related U.S. Application Data

(63) Continuation of application No. PCT/CN2013/085347, filed on Oct. 16, 2013.

(30) Foreign Application Priority Data

May 24, 2013 (CN) .......................... 2013 1 0198454

(51) Int. Cl.
*G10L 15/00* (2013.01)
*G10L 15/04* (2013.01)
(Continued)

(52) U.S. Cl.
CPC .......... *G10L 15/1815* (2013.01); *G06F 17/27* (2013.01); *G10L 15/26* (2013.01);
(Continued)

(58) Field of Classification Search
CPC .......................... G06F 17/2725; G10L 15/187
(Continued)

(56) References Cited

U.S. PATENT DOCUMENTS

| 5,146,405 A | 9/1992 | Church |
| 5,802,534 A | 9/1998 | Hatayama et al. |

(Continued)

FOREIGN PATENT DOCUMENTS

| CN | 1235312 | 11/1999 |
| CN | 1560834 | 1/2005 |

(Continued)

OTHER PUBLICATIONS

Chinese Patent Office, Office Action issued Jul. 13, 2015, in Application No. 201310198454.X.
(Continued)

*Primary Examiner* — Farzad Kazeminezhad
(74) *Attorney, Agent, or Firm* — Jones Day (57) ABSTRACT

Systems and methods are provided for adding punctuations. For example, one or more first feature units are identified in a voice file taken as a whole; the voice file is divided into multiple segments by detecting silences in the voice file; one or more second feature units are identified in the voice file; a first aggregate weight of first punctuation states of the voice file and a second aggregate weight of second punctuation states of the voice file are determined, using a language model established based on word separation and third semantic features; a weighted calculation is performed to generate a third aggregate weight based on a linear combination associated with the first aggregate weight and
(Continued)

the second aggregate weight; and one or more final punctuations are added to the voice file based on at least information associated with the third aggregate weight.

23 Claims, 6 Drawing Sheets (51) Int. Cl.
    G10L 15/18        (2013.01)
    G10L 15/26        (2006.01)
    G10L 15/187       (2013.01)
    G06F 17/27        (2006.01)
    G10L 15/183       (2013.01)
(52) U.S. Cl.
    CPC ........ *G10L 15/265* (2013.01); *G06F 17/2725* (2013.01); *G10L 15/04* (2013.01); *G10L 15/183* (2013.01); *G10L 15/187* (2013.01)
(58) Field of Classification Search
    USPC .................................................. 704/257, 251
    See application file for complete search history.

(56) References Cited

U.S. PATENT DOCUMENTS

| | | | |
|---|---|---|---|
| 6,067,514 A | 5/2000 | Chen | |
| 6,173,261 B1 | 1/2001 | Arai et al. | |
| 6,175,820 B1 | 1/2001 | Dietz | |
| 6,321,197 B1 | 11/2001 | Kushner et al. | |
| 6,778,958 B1 | 8/2004 | Nishimura et al. | |
| 6,985,863 B2 * | 1/2006 | Itoh ....................... | G10L 15/187 704/251 |
| 7,580,838 B2 * | 8/2009 | Divay ................. | G06F 17/2725 704/257 |
| 8,260,619 B1 | 9/2012 | Bansal et al. | |
| 8,612,204 B1 | 12/2013 | Uszkoreit | |
| 8,918,317 B2 | 12/2014 | Fritsch et al. | |
| 9,442,910 B2 | 9/2016 | Liu | |
| 2002/0069055 A1 | 6/2002 | Tang et al. | |
| 2002/0156627 A1 | 10/2002 | Itoh et al. | |
| 2004/0138881 A1 | 7/2004 | Divay et al. | |
| 2004/0260663 A1 | 12/2004 | Aggarwal et al. | |
| 2004/0262663 A1 | 12/2004 | Lin et al. | |
| 2006/0080309 A1 | 4/2006 | Yacoub et al. | |
| 2009/0281791 A1 | 11/2009 | Li | |
| 2010/0121638 A1 | 5/2010 | Pinson et al. | |
| 2010/0121639 A1 | 5/2010 | Zweig | |
| 2010/0241429 A1 | 9/2010 | Siminoff | |
| 2010/0292989 A1 | 11/2010 | Kitade et al. | |
| 2011/0010175 A1 | 1/2011 | Kitade et al. | |
| 2011/0112837 A1 | 5/2011 | Kurkl-Suonio et al. | |
| 2011/0288863 A1 | 11/2011 | Rasmussen | |
| 2014/0214406 A1 | 7/2014 | Liu | |
| 2014/0350918 A1 | 11/2014 | Liu | |

FOREIGN PATENT DOCUMENTS

| | | |
|---|---|---|
| CN | 1945693 | 4/2007 |
| CN | 102231278 A | 11/2011 |
| EP | 2387033 | 11/2011 |
| JP | H05-314168 | 11/1993 |
| JP | 2001134289 | 5/2001 |
| WO | WO 2004/003887 | 1/2004 |

OTHER PUBLICATIONS

Patent Cooperation Treaty, International Search Report, PCT/CN2013/085347, mailed Feb. 27, 2014.
Beeferman et al., "Cyberpunc: A Lightweight Punctuation Annotation System for Speech," Proceedings of the 1998 IEEE International Conference on Acoustics, Speech and Signal Processing, IEEE, vol. 2, 1998.
Christensen et al., "Punctuation Annotation Using Statistical Prosody Models," *ISCA Tutorial and Research Workshop (ITRW) on Prosody in Speech Recognition and Understanding*, 2001.
Huang et al., "Maximum Entropy Model for Punctuation Annotation from Speech," *Interspeech*, 2002.
Kim et al., "The Use of Prosody in a Combined System for Punctuation Generation and Speech Recognition," *Interspeech*, 2001.
Kolář et al., "Automatic Punctuation Annotation in Czech Broadcast News Speech," *SPECOM*, 2004.
Patent Cooperation Treaty, International Preliminary Report on Patentability, PCT/CN2013/085347, Nov. 24, 2015.
Patent Cooperation Treaty, International Preliminary Report on Patentability, PCT/CN2013/086618, Aug. 4, 2015.
Patent Cooperation Treaty, International Preliminary Report on Patentability, PCT/CN2013/087826, Nov. 24, 2015.
Patent Cooperation Treaty, International Search Report, PCT/CN2013/086618, Feb. 20, 2014.
Patent Cooperation Treaty, International Search Report, PCT/CN2013/087826, Feb. 27, 2014.
Patent Cooperation Treaty, Written Opinion of the International Searching Authority, PCT/CN2013/085347, Feb. 27, 2014.
Patent Cooperation Treaty, Written Opinion of the International Searching Authority, PCT/CN2013/086618, Feb. 20, 2014.
Patent Cooperation Treaty, Written Opinion of the International Searching Authority, PCT/CN2013/087826, Feb. 27, 2014.
United States Patent and Trademark Office, Office Action mailed Apr. 1, 2016, in U.S. Appl. No. 14/219,704.
United States Patent and Trademark Office, Office Action mailed Feb. 26, 2016, in U.S. Appl. No. 14/148,579.
Chinese Patent Office, Office Action mailed Jul. 16, 2015, in Application No. 201310196391.4.
United States Patent and Trademark Office, Office Action mailed Sep. 29, 2016, in U.S. Appl. No. 14/148,579.
United States Patent and Trademark Office, Notice of Allowance dated Aug. 1, 2017, in U.S. Appl. No. 14/148,579.

* cited by examiner

SYSTEMS AND METHODS FOR ADDING PUNCTUATIONS BY DETECTING SILENCES IN A VOICE USING PLURALITY OF AGGREGATE WEIGHTS WHICH OBEY A LINEAR RELATIONSHIP

CROSS-REFERENCES TO RELATED APPLICATIONS

This application is a continuation of International Application No. PCT/CN2013/085347, with an international filing date of Oct. 16, 2013, now pending, which claims priority to Chinese Patent Application No. 201310198454.X, filed May 24, 2013, both applications being incorporated by reference herein for all purposes.

BACKGROUND OF THE INVENTION

The present invention is directed to computer technology. More particularly, the invention provides systems and methods for data processing. Merely by way of example, the invention has been applied to computer files. But it would be recognized that the invention has a much broader range of applicability.

For certain applications in the fields of communications and internet, punctuations are often added to some punctuation-less files. For example, punctuations can be added to certain voice files.

A conventional approach for adding punctuations to a voice file is based on character separation and character positions. Specifically, sentences in a corpus are divided into characters and the position of each character in the sentences is determined, e.g., at the beginning of a sentence, in the middle, or at the end of the sentence. Further, a punctuation state associated with each character is determined, e.g., whether there is a punctuation that follows the character. A language model is established based on the position of each character in the corpus and the punctuation state associated with the character. When adding punctuations to a voice file, the voice file is processed as a whole, and punctuations can be added based on the characters in the voice file and the language model.

But limited information is implemented to establish the language model based on character positions and punctuation states associated with the characters, and the implemented information is not closely related to the punctuation states. Thus, such a language model often may not extract the actual relationship between information associated with the sentences in the voice file and the punctuation states of the sentences. Furthermore, the internal structural characteristics of the voice file are not considered when punctuations are added to the voice file that is simply taken as a whole. In view of the above-noted factors, the conventional approach for punctuation addition often has a low accuracy.

Hence it is highly desirable to improve the techniques for punctuation addition.

BRIEF SUMMARY OF THE INVENTION

The present invention is directed to computer technology. More particularly, the invention provides systems and methods for data processing. Merely by way of example, the invention has been applied to computer files. But it would be recognized that the invention has a much broader range of applicability.

According to one embodiment, a method is provided for adding punctuations. For example, one or more first feature units are identified in a voice file taken as a whole based on at least information associated with one or more first words in the voice file and one or more first semantic features related to the first words; the voice file is divided into multiple segments based on at least information associated with a silence detection; one or more second feature units are identified in the voice file based on at least information associated with one or more second words in the segments and one or more second semantic features related to the second words; a first aggregate weight of first punctuation states of the voice file based on at least information associated with the first feature units and a second aggregate weight of second punctuation states of the voice file based on at least information associated with the second feature units are determined, using a language model established based on word separation and third semantic features; a weighted calculation is performed to generate a third aggregate weight based on at least information associated with the first aggregate weight and the second aggregate weight; and one or more final punctuations are added to the voice file based on at least information associated with the third aggregate weight.

According to another embodiment, a system for adding punctuations includes a silence-detection module, an identification module, and a punctuation-addition module. The silence-detection module is configured to divide a voice file to be processed into multiple segments based on at least information associated with a silence detection. The identification module is configured to identify one or more first feature units in the voice file taken as a whole based on at least information associated with one or more first words in the voice file and one or more first semantic features related to the first words and identify one or more second feature units in the voice file based on at least information associated with one or more second words in the segments and one or more second semantic features related to the second words. The punctuation-addition module is configured to determine, using a language model established based on word separation and third semantic features, a first aggregate weight of first punctuation states of the voice file based on at least information associated with the first feature units and a second aggregate weight of second punctuation states of the voice file based on at least information associated with the second feature units, perform a weighted calculation to generate a third aggregate weight based on at least information associated with the first aggregate weight and the second aggregate weight, and add one or more final punctuations to the voice file based on at least information associated with the third aggregate weight.

According to yet another embodiment, a non-transitory computer readable storage medium comprises programming instructions for adding punctuations. The programming instructions are configured to cause one or more data processors to execute the following operations. For example, one or more first feature units are identified in a voice file taken as a whole based on at least information associated with one or more first words in the voice file and one or more first semantic features related to the first words; the voice file is divided into multiple segments based on at least information associated with a silence detection; one or more second feature units are identified in the voice file based on at least information associated with one or more second words in the segments and one or more second semantic features related to the second words; a first aggregate weight of first punctuation states of the voice file based on at least information associated with the first feature units and a second aggregate weight of second punctuation states of the voice file based on at least information associated with the second feature units are determined, using a language model established based on word separation and third semantic features; a weighted calculation is performed to generate a third aggregate weight based on at least information associated with the first aggregate weight and the second aggregate weight; and one or more final punctuations are added to the voice file based on at least information associated with the third aggregate weight.

For example, the systems and methods described herein are configured to implement word separation to take into account semantic features of words for accurate punctuation addition. In another example, the systems and methods described herein are configured to take into account the context information of sentences for extraction of features to better reflect correlations between semantic features for accurate punctuation addition.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

The present invention is directed to computer technology. More particularly, the invention provides systems and methods for data processing. Merely by way of example, the invention has been applied to computer files. But it would be recognized that the invention has a much broader range of applicability.

Figure 1:
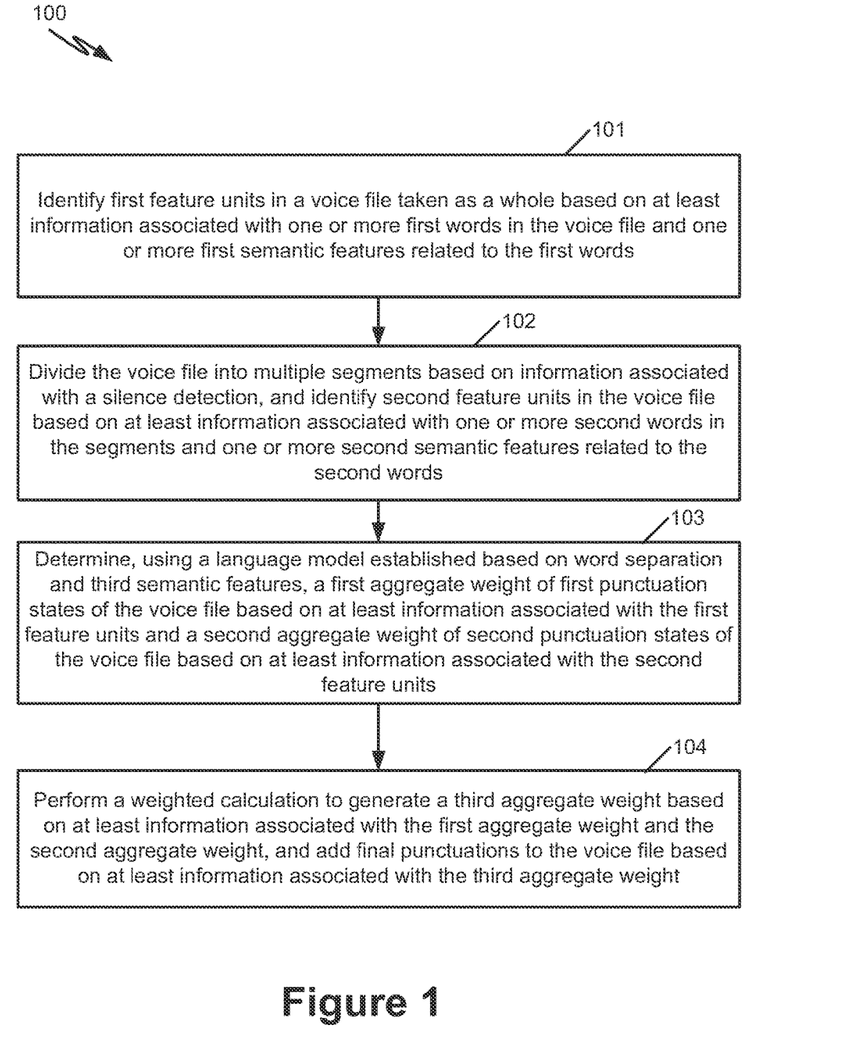
FIG. 1 is a simplified diagram showing a method for adding punctuations according to one embodiment of the present invention.

FIG. 1 is a simplified diagram showing a method for adding punctuations according to one embodiment of the present invention. This diagram is merely an example, which should not unduly limit the scope of the claims. One of ordinary skill in the art would recognize many variations, alternatives, and modifications. The method 100 includes at least the process 101 for identifying first feature units in a voice file taken as a whole, the process 102 for dividing the voice file into multiple segments and identifying second feature units in the voice file, the process 103 for determining, using a language model, a first aggregate weight of first punctuation states of the voice file and a second aggregate weight of second punctuation states of the voice file, and the process 104 for performing a weighted calculation to generate a third aggregate weight and adding one or more final punctuations to the voice file.

According to one embodiment, during the process 101, a voice file to be processed is taken as a whole, and a number of first feature units (e.g., N1) are identified in the voice file based on at least information associated with one or more first words in the voice file and one or more first semantic features related to the first words. For example, during the process 102, the voice file to be processed is divided into multiple segments based on at least information associated with a silence detection, and a number of second feature units (e.g., N2) are identified in the voice file to be processed based on at least information associated with one or more second words in the segments and one or more second semantic features related to the second words. As an example, the semantic features include parts of speech and/or sentence elements. For example, part of speech and/or a sentence element associated with a particular word can be different or remain the same in different contexts.

According to another embodiment, during the process 103, a language model established based on word separation and third semantic features is used to determine a first aggregate weight of first punctuation states of the voice file based on at least information associated with the first feature units (e.g., N1) and a second aggregate weight of second punctuation states of the voice file based on at least information associated with the second feature units (e.g., N2). For example, the language model stores a mapping between each feature unit and preliminary weights for certain preliminary punctuation states related to the feature unit.

According to yet another embodiment, to determine the first aggregate weight, a first mapping between the first feature units and one or more first preliminary weights for one or more first preliminary punctuation states associated with the first feature units is acquired from the language model. For example, one or more first word weights related to the first punctuation states are determined based on at least information associated with the first mapping. As an example, the first aggregate weight of the first punctuation states of the voice file is calculated based on at least information associated with the first word weights.

According to yet another embodiment, to determine the second aggregate weight, a second mapping between the second feature units and one or more second preliminary weights for one or more second preliminary punctuation states associated with the second feature units is acquired from the language model. For example, one or more second word weights related to the second punctuation states are determined based on at least information associated with the second mapping. As an example, the second aggregate weight of the second punctuation states of the voice file is calculated based on at least information associated with the second word weights.

In one embodiment, during the process 104, a weighted calculation is performed to generate a third aggregate weight based on at least information associated with the first aggregate weight and the second aggregate weight. For example, one or more final punctuations are added to the voice file based on at least information associated with the third aggregate weight.

In some embodiments, silence intervals in the voice file affect the semantic features of words and the feature units of the voice file. For example, under some circumstances, silence intervals may be generated because a speaker talks slowly, or because the speaker thinks or hesitates when talking. As shown in FIG. 1, on one hand, the voice file is processed as a whole to discern the semantic features of words included in the voice file, and the first feature units appeared in the voice file are determined so as to determined the first aggregate weight of various punctuation states of the voice file, according to certain embodiments. On the other hand, during the process of determining the semantic features and extracting the feature units, the voice file is divided into multiple segments to be processed through the silence detection in order to take into account the effects of the internal structure of the voice file on the semantic features and the feature units, according to some embodiments. For example, the second feature units appeared in the voice file are determined, and the second aggregate weight of various punctuation states of the voice file is determined. As an example, the final punctuations are added to the voice file according to the third aggregate weight that is generated through the weighted calculation of the first aggregate weight and the second aggregate weight. Thus, the effects of the silence intervals on the semantic features of the words and the feature units of the voice file are taken into consideration, while certain inaccuracies of punctuation addition related to some silence intervals that are generated because the speaker talks slowly or because the speaker thinks or hesitates when talking may be avoided, in certain embodiments.

In one embodiment, the process 101 and the process 102 are executed in parallel for feature unit identification, e.g., through two different routes. As an example, during the process 101, the voice file is processed as a whole (e.g., using a feature-unit identification module) for identifying the first feature units. In another example, during the parallel process 102, the silence detection is performed on the voice file, and the voice file is divided into the multiple segments based on at least information associated with the silence detection. Each segment is processed (e.g., using the feature-unit identification module), and the second feature units in the voice file are identified based on at least information associated with the second words in the segments and the second semantic features related to the second words, according to some embodiments.

In another embodiment, after dividing the voice file into multiple segments based on at least information associated with the silence detection, structural information of the voice file is stored. For example, the multiple segments can be identified based on the structural information. Then, on one hand, the voice file is processed as a whole for identifying the first feature units. On the other hand, one or more third feature units for each segment of the voice file, and the aggregation of the third feature units of the multiple segments yields the second feature units.

In yet another embodiment, dividing the voice file into multiple segments based on at least information associated with the silence detection includes detecting a silence duration in the voice file, and comparing the silence duration with a predetermined silence threshold. For example, if the silence duration exceeds the silence threshold, generating a segment from the voice file based on at least information associated with a silence location corresponding to the silence duration. In some embodiments, different silence thresholds are predetermined for different application scenarios, respectively, in order to satisfy different punctuation needs under these scenarios. For example, punctuations need to be added for voice inputs in a map-based application scenario. The voice inputs may be related to location names, and short pauses may appear in the voice inputs because the location names are very long or a speaker is unfamiliar with the location names. A long silence threshold may be set for such a map-based application scenario to avoid inserting punctuations into a long location name so as to improve the accuracy of punctuation addition.

Figure 2:
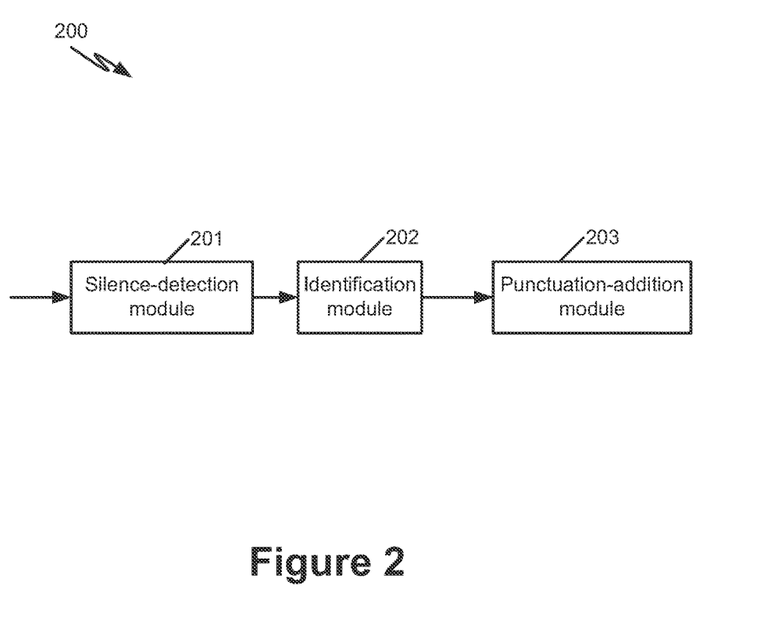
FIG. 2 is a simplified diagram showing a system for adding punctuations according to one embodiment of the present invention.

FIG. 2 is a simplified diagram showing a system for adding punctuations according to one embodiment of the present invention. This diagram is merely an example, which should not unduly limit the scope of the claims. One of ordinary skill in the art would recognize many variations, alternatives, and modifications. As shown in FIG. 2, the system 200 includes a silence-detection module 201, an identification module 202 and a punctuation-addition module 203.

According to some embodiments, the silence-detection module 201 is configured to divide a voice file to be processed into multiple segments based on at least information associated with a silence detection. For example, the identification module 202 is configured to identify one or more first feature units (e.g., N1) in the voice file taken as a whole based on at least information associated with one or more first words in the voice file and one or more first semantic features related to the first words and identify one or more second feature units (e.g., N2) in the voice file based on at least information associated with one or more second words in the segments and one or more second semantic features related to the second words. As an example, the punctuation-addition module 203 configured to, determine, using a language model established based on word separation and third semantic features, a first aggregate weight of first punctuation states of the voice file based on at least information associated with the first feature units and a second aggregate weight of second punctuation states of the voice file based on at least information associated with the second feature units, perform a weighted calculation to generate a third aggregate weight based on at least information associated with the first aggregate weight and the second aggregate weight, and add one or more final punctuations to the voice file based on at least information associated with the third aggregate weight.

Figure 3:
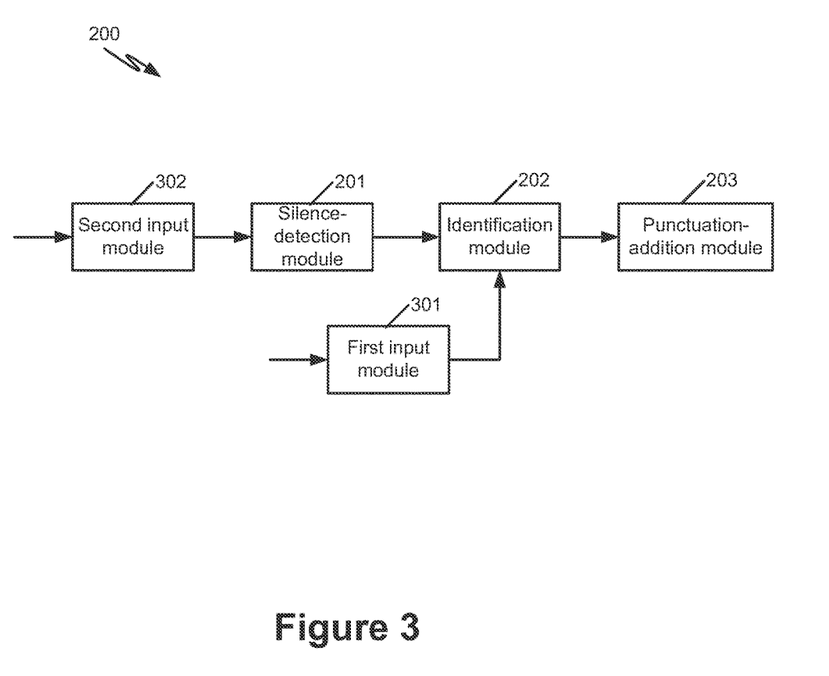
FIG. 3 is a simplified diagram showing a system for adding punctuations according to another embodiment of the present invention.

FIG. 3 is a simplified diagram showing the system 200 for adding punctuations according to another embodiment of the present invention. This diagram is merely an example, which should not unduly limit the scope of the claims. One of ordinary skill in the art would recognize many variations, alternatives, and modifications. As shown in FIG. 3, the system 200 further includes a first input module 301 and a second input module 302.

According to one embodiment, the first input module 301 is coupled to the identification module 202 and configured to provide the voice file to be processed as a whole to the identification module 202. For example, the identification module 202 is further configured to receive the voice file from the first input module 301 and process the voice file as a whole for identifying the first feature units. As an example, the second input module 302 is coupled to the silence-detection module 201 and configured to provide the voice file to the silence-detection module 201. In another example, the silence-detection module 201 is further configured to provide the segments of the voice file to the identification module 202. In yet another example, the identification module 202 is further configured to identify the second feature units in the voice file based on at least information associated with the second words in the segments and the second semantic features related to the second words.

As shown in FIG. 3, the first input module 301 and the second input module 302 provide the voice file in parallel to the identification module 202, according to certain embodiments. For example, the identification module 202 is configured to process the voice file from the first input module

301 as a whole to identify the first feature units, and process the voice from the second input module 302 to identify the second feature units based on the segments of the voice file.

As discussed above and further emphasized here, FIG. 2 and FIG. 3 are merely examples, which should not unduly limit the scope of the claims. One of ordinary skill in the art would recognize many variations, alternatives, and modifications. For example, the identification module 202 is configured to perform identification of the first feature units and identification of the second feature units in parallel approximately simultaneously.

According to one embodiment, the silence-detection module 301 is further configured to determine a silence threshold according to a current application scenario, detect a silence duration in the voice file, and if the silence duration exceeds the silence threshold, and generate a segment from the voice file based on at least information associated with a silence location corresponding to the silence duration. For example, the punctuation-addition module includes an aggregate-weight-determination component, an aggregate-weight-integration component, and a punctuation-addition component. As an example, the aggregate-weight-determination component is configured to determine, using the language model the first aggregate weight of the first punctuation states of the voice file based on at least information associated with the first feature units and the second aggregate weight of the second punctuation states of the voice file based on at least information associated with the second feature units. In another example, the aggregate-weight-integration component is configured to perform the weighted calculation to generate the third aggregate weight based on at least information associated with the first aggregate weight and the second aggregate weight. In yet another example, the punctuation-addition component is configured to add the final punctuations to the voice file based on at least information associated with the third aggregate weight.

According to another embodiment, the aggregate-weight-determination component is further configured to, acquire from the language model a first mapping between the first feature units and one or more first preliminary weights for one or more first preliminary punctuation states associated with the first feature units, determine one or more first word weights related to the first punctuation states based on at least information associated with the first mapping, and calculate the first aggregate weight of the first punctuation states of the voice file based on at least information associated with the first word weights. According to yet another embodiment, the aggregate-weight-determination component is further configured to, acquire from the language model a second mapping between the second feature units and one or more second preliminary weights for one or more second preliminary punctuation states associated with the second feature units, determine one or more second word weights related to the second punctuation states based on at least information associated with the second mapping, and calculate the second aggregate weight of the second punctuation states of the voice file based on at least information associated with the second word weights.

In one embodiment, the identification module 202 includes a semantic-identification component and a feature-extraction component. As an example, the semantic-identification component is configured to identify each word in the voice file or in a segment of the voice file and one or more semantic features of the word. In another example, the feature-extraction component is configured to determine one or more feature units in the voice file based on at least information associated with a predetermined feature template, the words in the voice file and the semantic features related to the words in the voice file.

In another embodiment, the punctuation-addition module 203 includes a weight-acquisition component and an aggregate-weight-calculation component. For example, the weight-acquisition component is configured to acquire from the language model a mapping between each feature unit of the voice file and one or more preliminary weights for one or more preliminary punctuation states associated with the feature unit. As an example, the aggregate-weight-calculation component is configured to determine, based on the acquired mapping, one or more weights for one or more punctuation states associated with each feature unit, and calculate the first aggregate weight or the second aggregate weight based on at least information associated with the weights associated with the feature units in the voice file.

In some embodiments, one or more word weights for one or more punctuation states of each word in the voice file are determined based on at least information associated with a mapping between an acquired feature unit and one or more weights for one or more punctuation states of the feature unit. For example, the word weights are determined based on a mapping function. Specifically, all feature units related to a particular word at a present position in the voice file are determined, and a mapping between each feature unit and one or more unit weights for one or more punctuation states of the feature unit is acquired. Based on a predetermined mapping function, one or more word weights for one or more punctuation states of the particular word are determined, according to certain embodiments. For example, words of a same meaning appear at different positions in the voice file are considered as different words, and are associated with different feature units and different punctuation states.

In certain embodiments, punctuation states of the voice file includes punctuation states of each word in the voice file and is equivalent to a combination of the punctuation states of all words in the voice file. For example, an aggregate weight of various punctuation states of the voice file is determined using an optimal-path algorithm. As an example, an optimal combination (i.e., an optimal path) of the punctuation states of all words in the voice file is determined using a Viterbi algorithm, where the optimal combination has a largest aggregate weight.

In one embodiment, the language model established based on word separation and semantic features of words includes a mapping between each feature unit and weights for punctuation states associated with the feature unit. For example, upon inquiry, a particular mapping between a particular feature unit and related weights for punctuation states is provided.

Figure 4:
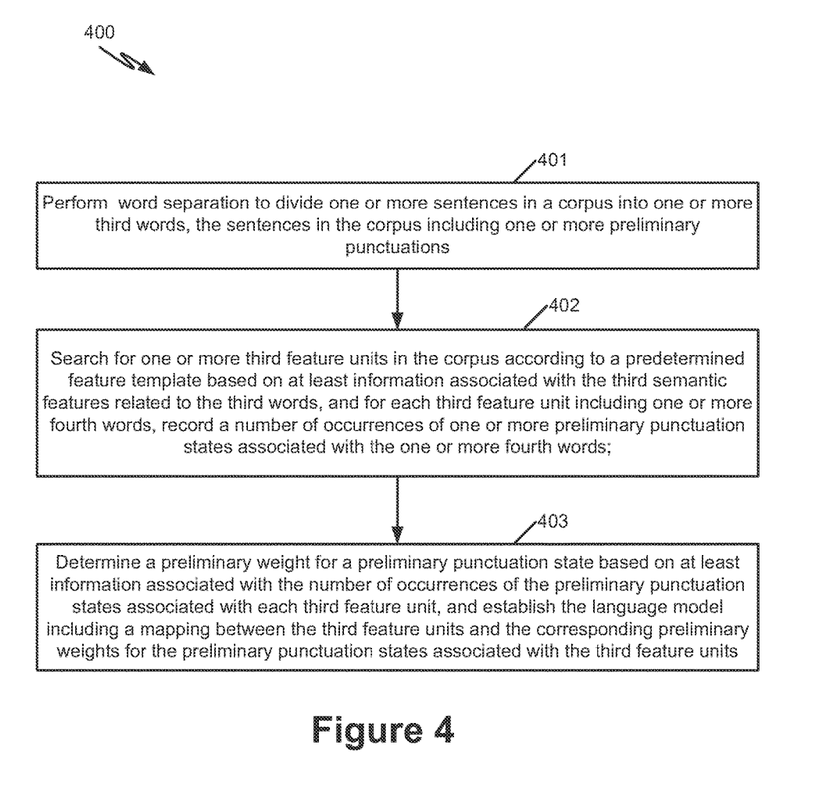
FIG. 4 is a simplified diagram showing a method for establishing a language model according to one embodiment of the present invention.

FIG. 4 is a simplified diagram showing a method for establishing a language model according to one embodiment of the present invention. This diagram is merely an example, which should not unduly limit the scope of the claims. One of ordinary skill in the art would recognize many variations, alternatives, and modifications. The method 400 includes at least the process 401 for performing word separation to divide one or more sentences in a corpus into one or more third words, the process 402 for searching for one or more third feature units in the corpus according to a predetermined feature template, and for each third feature unit including one or more fourth words, recording a number of occurrences of one or more preliminary punctuation states associated with the one or more fourth words, and the process 403 for determining a preliminary weight for a preliminary punctuation state and establishing the language model.

According to one embodiment, during the process 401, word separation is performed to divide one or more sentences in a corpus into one or more third words, the sentences in the corpus including one or more preliminary punctuations. For example, during the process 402, one or more third feature units are searched for in the corpus according to a predetermined feature template based on at least information associated with the third semantic features related to the third words, and for each third feature unit including one or more fourth words, a number of occurrences of one or more preliminary punctuation states associated with the one or more fourth words are recorded. In another example, during the process 403, a preliminary weight is determined for a preliminary punctuation state based on at least information associated with the number of occurrences of the preliminary punctuation states, and the language model is established including a mapping between each of the third feature units and the corresponding preliminary weights for the preliminary punctuation states associated with each of the third feature units.

Figure 5:
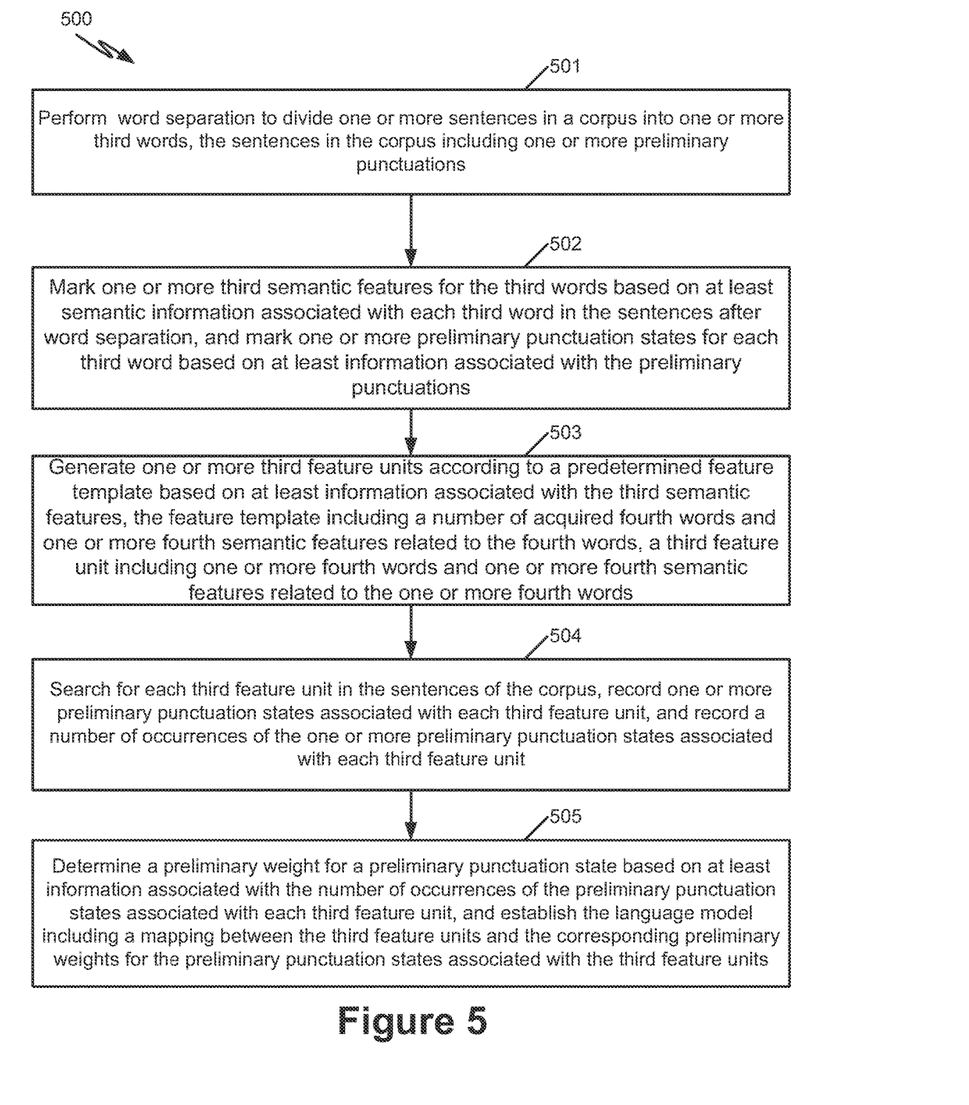
FIG. 5 is a simplified diagram showing a method for establishing a language model according to another embodiment of the present invention.

In some embodiments, the process 402 is executed in two different ways. For example, semantic features and punctuation state of each word in the sentences of the corpus are marked. Then, feature units are searched in the corpus according to the predetermined feature template, and the number of the occurrences associated with each feature unit is recoded, e.g., as shown in FIG. 5. In another example, semantic features and punctuation states of each word in the sentences of the corpus are identified in real time when search for feature units in the corpus according to the predetermined feature template.

FIG. 5 is a simplified diagram showing a method for establishing a language model according to another embodiment of the present invention. This diagram is merely an example, which should not unduly limit the scope of the claims. One of ordinary skill in the art would recognize many variations, alternatives, and modifications.

The method 500 includes at least the process 501 for performing word separation to divide one or more sentences in a corpus into one or more third words, where the sentences in the corpus include one or more preliminary punctuations, the process 502 for marking one or more third semantic features for the third words based on at least semantic information associated with each third word in the sentences after word separation, and marking one or more preliminary punctuation states for each third word based on at least information associated with the preliminary punctuations, and the process 503 for generating one or more third feature units according to a predetermined feature template based on at least information associated with the third semantic features, where the feature template includes a number of acquired fourth words and one or more fourth semantic features related to the fourth words, and a third feature unit includes one or more fourth words and one or more fourth semantic features related to the one or more fourth words.

In addition, the method 500 includes the process 504 for searching for each third feature unit in the sentences of the corpus, recording one or more preliminary punctuation states associated with each third feature unit, and recording a number of occurrences of the one or more preliminary punctuation states associated with each third feature unit, and the process 505 for determining a preliminary weight for a preliminary punctuation state based on at least information associated with the number of occurrences of the preliminary punctuation states associated with each third feature unit, and establishing the language model including a mapping between each of the third feature units and the corresponding preliminary weights for the preliminary punctuation states associated with each of the third feature units.

In some embodiments, the process 503 and the process 504 are combined into a single process. For example, a feature unit is extracted from the sentences of the corpus according to the predetermined feature template. If the extracted feature unit has never appeared before, the extraction of such a feature unit is equivalent to the generation of a new feature unit, and a number of the new feature unit being found in the sentences of the corpus is determined to be 1.

In certain embodiments, the feature units can be extracted based on semantic features of words as well as position information of the words. For example, the position information of a word includes the word's relative-position information with respect to a present reference position, and thus an extracted feature unit includes the word, semantic features of the word, and the word's relative-position information with respect to the present reference position. Specifically, the predetermined feature template includes a number of the acquired words, the semantic features of the acquired words and the predetermined requirements to be satisfied for the relative-position relationship between the acquired words and the present reference position, in some embodiments.

In some embodiments, the extraction of feature units from the sentences according to the predetermined feature template includes: selecting a position of each word in the sentences of the corpus after word separation as a present reference position, determining one or more words satisfying the predetermined requirements for the relative-position relationship with respect to the present reference position, and generating one or more feature units based on at least information associated with semantic features of the determined words and the relative-position relationship. For example, a generated feature unit includes the relative-position relationship between a word and the present reference position.

According to one embodiment, correlation between words can be determined based on at least information associated with a feature template including requirements for the relative-position relationship associated with the words. For example, a feature unit extracted based on the feature template includes the correlation between words which is related to punctuation states. As an example, a language model established according to the feature unit and weights related to the punctuation states reflects a relationship between the information contained in the sentences and the punctuation states.

According to another embodiment, the predetermined feature template includes a single-word template and/or a multi-word template depending on the number of words to be acquired according to the predetermined feature template. For example, the single-word template includes acquisition of a single word satisfying a predetermined relative-position relationship with a present reference position and one or more semantic features of the single word. As an example, the relative-position relationship involves acquisition of the word at the present reference position or acquisition of the words at other positions, such as the position before or after the present reference position.

According to yet another embodiment, the acquisition of the single-word feature unit based on at least information associated with the single-word feature template includes: selecting a position of each word of the sentences in the corpus as the present reference position; determining a word satisfying the predetermined relative-position relationship with the present reference position; and identifying the single-word feature unit based on at least information associated with the semantic features related to the determined word. For example, the single-word feature unit includes the determined word, the semantic features related to the determined word, and the predetermined relative-position relationship between the determined word and the present reference position.

In one embodiment, the multi-word feature template includes acquisition of multiple words satisfying a predetermined relative-position relationship with a present reference position and one or more semantic features related to the multiple words. For example, the acquisition of the multi-word feature unit based on at least information associated with the multi-word feature template includes: selecting a position of each word in the sentences of the corpus as the present reference position, determining multiple words satisfying the predetermined relative-position relationship with the present reference position, and identifying the multi-word feature unit based on at least information associated with the semantic features related to the determined words. In another example, the multi-word feature unit includes the determined words, the semantic features related to the determined words, and the predetermined relative-position relationship between the determined words and the present reference position.

In another embodiment, different types of single-word templates are obtained through changing requirements for the relative-position relationship with respect to the present reference position contained in a single-word template, such as, a single-word template (Template T00) for acquiring a word at the present reference position and the corresponding semantic features, a single-word template (Template T01) for acquiring a word at a position immediately before the present reference position and the corresponding semantic features, and a single-word template (Template T02) for acquiring a word at a position immediately after the present reference position and the corresponding semantic features. In yet another embodiment, different types of multi-word templates are obtained through changing the requirements for the relative-position relationship with respect to the present reference position in a multi-word feature template, such as a multi-word template (Template T05) for acquiring words at the present reference position, a position immediately before the present reference position and a position immediately after the present reference position and the corresponding semantic features, and a multi-word template (Template T06) for acquiring words at the present reference position and at two positions immediately before the present reference position and the corresponding semantic features. As an example, the more words to be acquired by a multi-word template, the higher correlation among the acquired words, and the more accurate punctuation addition will be according to the established language model. In another example, the more types of templates, the more consideration of the correlation between the semantic features in the sentences and punctuation states, and the more accurate punctuation addition will be according the established language model.

Referring to FIG. 5, during the process 505, an identification (ID) is assigned to each feature unit, and the established language model includes the IDs, the corresponding feature units, and weight information of punctuation states related to the feature units, in some embodiments. For example, a semantic feature of a word includes part of speech of the word in a sentence and/or a sentence element the word serves as in the sentence.

In one embodiment, assuming the corpus includes a sentence (in Chinese): "今天天气不错，我们下午去打球，然后去吃饭" (English translation: It is a good day. We will play ball in the afternoon and then have supper). For example, a language model can be established through the following operations according to FIG. 5.

Operation 1: perform word separation to divide the sentence into words. For example, the sentence "今天天气不错，我们下午，去打球，然后去吃饭" is divided into the following words: 今 天，天气，不错，我们，下午，去，打球，然后，去，吃饭.

Operation 2: mark semantic features and punctuation states of each word in the sentence after word separation. As an example, the semantic features include parts of speech and sentence elements. Table 1 illustrates the marking results of the sentence.

TABLE 1

| Content | 今天 (today) | 天气 (weather) | 不错 (good) | 我们 (we) | 下午 (afternoon) |
|---|---|---|---|---|---|
| Part of speech | Noun | Noun | Adjective | Pronoun | Noun |
| Sentence element | Adverbial modifier | Subject | Predicate | Subject | Adverbial modifier |
| Punctuation | N/A | N/A | Comma | N/A | N/A |
| Content | 去 (go) | 打球 (play ball) | 然后 (then) | 去 (go) | 吃饭 (eat supper) |
| Part of speech | Verb | Noun | Adverb | Verb | Noun |
| Sentence element | Predicate | Adverbial modifier | Adverbial modifier | Predicate | Object |
| Punctuation | N/A | Comma | N/A | N/A | Period |

Operation 3: extract (e.g., generate) feature units from the sentence according to the marking results in Operation 2 and the predetermined feature template, assign an ID to each feature unit, and record a number of occurrences of each punctuation state of each feature unit. For example, the feature unit includes the word(s) and the semantic features of the word(s). As an example, assuming that the predetermined feature templates include single-word templates T00, T01 and T02 and a multi-word template T05. For example, the single-word template T00 is used to acquire a word at the present reference position and the corresponding semantic features; the single-word template T01 is used to acquire a word at a position immediately before the present reference position and the corresponding semantic features; the single-word template T02 is used to acquire a word at a position immediately after the present reference position and the corresponding semantic features; and the multi-word template T05 is used to acquire words at the present reference position, a position immediately before the present reference position and a position immediately after the present reference position and the corresponding semantic features.

In some embodiments, the position of each word in the sentence marked in the Operation 2 is selected as the present reference position, and feature units are extracted according to the single-word templates T00. T01 and T02 and the multi-word template T05. For example, the position of "今天" is taken as the present reference position. Then, according to Template T00, a feature unit including "今天" an the semantic features of "今天" (i.e. noun and adverbial modifier) are acquired. According to Template T01, a feature unit including "天气" and the semantic features of "天气" (i.e. noun and subject) are acquired. According to Template T02, a feature unit including "不错" and the semantic features of "不错" (i.e. adjective and predicate) are acquired. In addition, according to Template T05, the following are acquired: a feature unit including "今天" and the semantic features of "今天" (i.e. noun and adverbial modifier), another feature unit including "天气" an the semantic features of "天气" i.e. noun and subject), as well as a feature unit "不错" and the semantic features of "不错" (i.e. adjective and predicate).

In certain embodiments, the relative position information of each word in the feature unit with respect to the present reference position is stored in the feature unit in an obvious manner. In some embodiments, the relative position information of each word in the feature unit with respect to the present reference position is stored in the feature unit is stored in a hidden manner according to the corresponding ID scope of each template by assigning the corresponding ID scope to the feature unit.

According to one embodiment, when the feature unit is extracted according to the feature template, if there is no word at a particular relative position required by the feature template, the absence of a word is indicated in a predetermined manner. For example, a predetermined character or a string of characters are used to indicate the absence of the word. As an example, there is no word before "今天" in the above-noted example sentence. If the position of "今天" is taken as the present reference position, the absence of a word at the position before "今天" is indicated in a predetermined manner when the feature units are extracted according to Templates T00 or T05.

According to another embodiment, after the feature units are extracted, different IDs are assigned to the feature units for differentiation. There are many ways to assign the IDs. For example, a hash value generated based on the content of a feature unit is used as an ID for the feature unit.

According to yet another embodiment, for each feature unit, a number of occurrences of the punctuation states of the feature unit is recorded according to the punctuation states of each word in the feature unit every time the feature unit appears in the sentence in the corpus. For example, the punctuation states of a feature unit includes the punctuation states of each word in the feature unit. That is, if the feature unit includes multiple words, the punctuation states of the feature unit corresponds to an aggregation of the punctuation states of the words. As an example, if the punctuation states of a word changes, the punctuation states of the feature unit changes in response. For example, a feature unit includes three words whose punctuation states are "N/A", "N/A" and "comma" respectively. The punctuation states of this feature unit is an aggregation of "N/A". "N/A" and "comma." As an example, if the punctuation state of the third word changes to "N/A", the punctuation states of this feature unit changes to "N/A", "N/A" and "N/A."

Operation 4: determine a weight of each punctuation state of each feature unit according to the feature units extracted in Operation 3 and the number of occurrences of each punctuation state of each feature unit, and establish the language model that includes a mapping between each feature unit and a weight of each punctuation state of the feature unit. For example, the weight of each punctuation state in each feature unit can be determined through an iterative optimization algorithm, e.g. a Newton iterative algorithm, a BFGS (Large-scale Bound-constrained Optimization) iterative algorithm, a L-BFGS (Software for Large-scale Bound-constrained Optimization) iterative algorithm and an OWL-QN (Orthant-Wise Limited-memory Quasi-Newton) iterative algorithm. As an example, the L-BFGS iterative algorithm has a fast iteration speed and can facilitate the establishment of language model.

Through the Operations 1 to 4, the established language model includes the mapping between each feature unit and the weights of various punctuation states of the feature unit, in some embodiments. For example, each feature unit has an ID that distinguishes it from other feature units. As an example, the mapping between each feature unit and the weights of various punctuation states of the feature unit can be searched for through the ID of the feature unit. In certain embodiments, a search request containing the ID of the feature unit is sent to the language model so as to acquire the mapping between the feature unit and the weights of various punctuation states of the feature unit from the language model. For example, the language model stores the ID for the feature unit, the feature unit and the mapping between the feature unit and the weights of various punctuation states of the feature unit.

According to another embodiment, in order to perform punctuation addition through the language model including the single-word feature unit, the following operations can be executed. For example, a position of each word of the sentences in the corpus is selected as the present reference position. As an example, a word satisfying the predetermined relative-position relationship with the present reference position is determined according to the single-word feature template. In another example, the single-word feature unit is identified based on at least information associated with the semantic features related to the determined word. For example, the single-word template includes acquisition of the word satisfying a predetermined relative-position relationship with a present reference position and the semantic features of the word. As an example, the single-word feature unit includes the determined word, the semantic features related to the determined word, and the predetermined relative-position relationship between the determined word and the present reference position.

According to yet another embodiment, in order to perform punctuation addition through the language model including the multi-word feature unit, the following operations can be executed. For example, a position of each word in the sentences of the corpus is selected as the present reference position. As an example, multiple words satisfying the predetermined relative-position relationship with the present reference position are determined according to the multi-word feature template. In another example, the multi-word feature unit is identified based on at least information associated with the semantic features related to the determined words. As an example, the multi-word feature template includes acquisition of multiple words satisfying the predetermined relative-position relationship with the present reference position and the semantic features related to the multiple words. In another example, the multi-word feature unit includes the multiple words, the semantic features related to the multiple words, and the predetermined relative-position relationship between the multiple words and the present reference position.

In one embodiment, in order to perform punctuation addition through the language model including the single-word feature unit, the identification module 202 is configured to perform the following operations. For example, the identification module 202 is configured to select a position of each word of the sentences in the corpus as the present reference position, determine a word satisfying the predetermined relative-position relationship with the present reference position according to the single-word feature template, and identify the single-word feature unit based on at least information associated with the semantic features related to the determined word. For example, the single-word template includes acquisition of the word satisfying a predetermined relative-position relationship with a present reference position and the semantic features of the word. As an example, the single-word feature unit includes the determined word, the semantic features related to the determined word, and the predetermined relative-position relationship between the determined word and the present reference position.

In another embodiment, in order to perform punctuation addition through the language model including the multi-word feature unit, the identification module 202 is configured to perform the following operations. For example, the identification module 202 is configured to select a position of each word in the sentences of the corpus as the present reference position, determine multiple words satisfying the predetermined relative-position relationship with the present reference position according to the multi-word feature template, and identify the multi-word feature unit based on at least information associated with the semantic features related to the determined words. As an example, the multi-word feature template includes acquisition of multiple words satisfying the predetermined relative-position relationship with the present reference position and the semantic features related to the multiple words. In another example, the multi-word feature unit includes the multiple words, the semantic features related to the multiple words, and the predetermined relative-position relationship between the multiple words and the present reference position.

Figure 6:
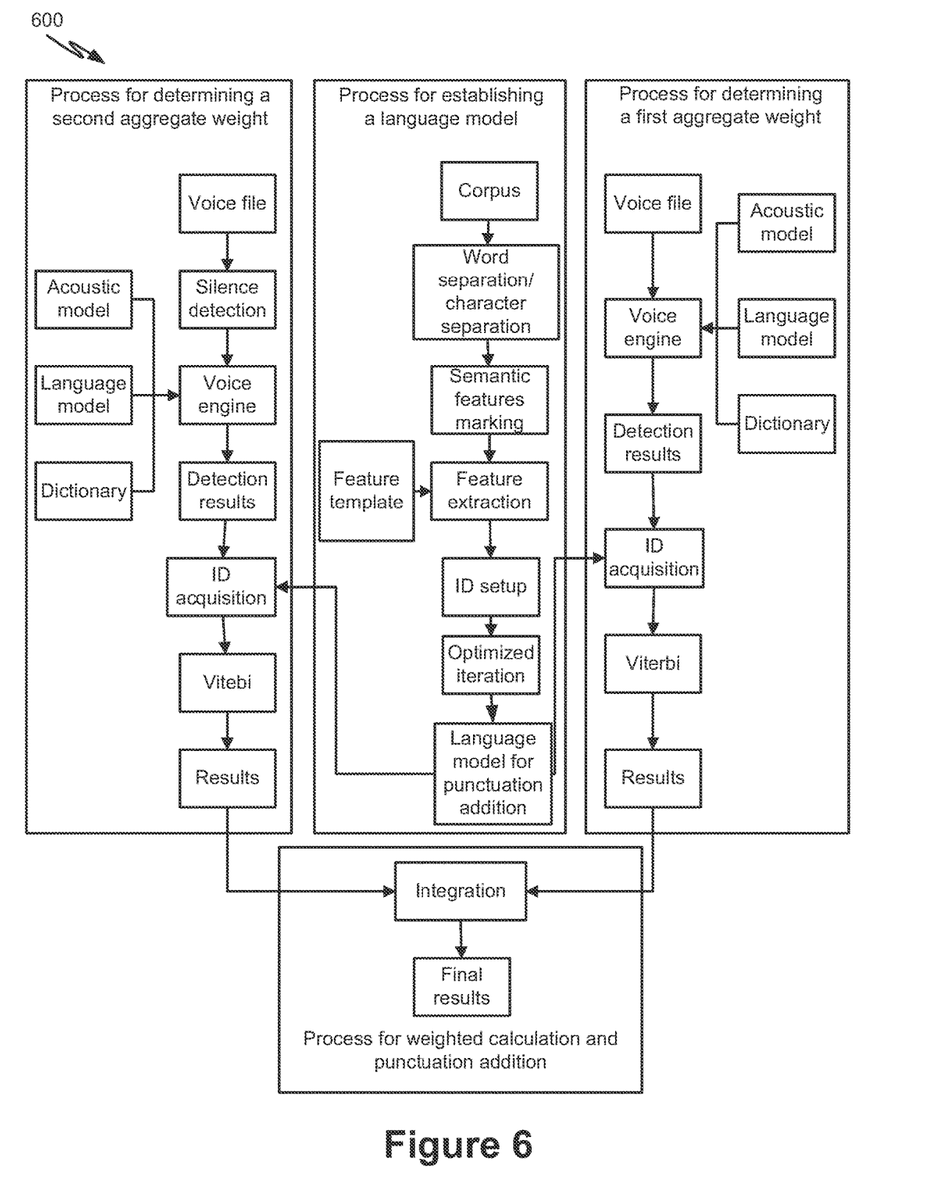
FIG. 6 is a simplified diagram showing a method for adding punctuations according to another embodiment of the present invention.

FIG. 6 is a simplified diagram showing a method for adding punctuations according to another embodiment of the present invention. This diagram is merely an example, which should not unduly limit the scope of the claims. One of ordinary skill in the art would recognize many variations, alternatives, and modifications. The method 600 includes at least the process for establishing a language model, the process for determining a first aggregate weight, the process for determining a second aggregate weight, and the process for weighted calculation and punctuation addition.

According to one embodiment, the process for establishing a language model is executed in advance. For example, once the language model is established, punctuations are added to a voice file based on the language model. As an example, the process for determining a first aggregate weight and the process for determining a second aggregate weight are executed in parallel, e.g., to improve the information-process speed. In another example, after obtaining the first aggregate weight and the second aggregate weight, the process for weighted calculation and punctuation addition is executed.

According to another embodiment, specifically, in the process for establishing the language model word separation and sentence separation are performed on the corpus. For example, semantic features of each word in the corpus are marked, and feature units are extracted according to a predetermined feature template based on the word-separation results and the semantic features of each word in the corpus. As an example, a number of occurrences of each punctuation state of each feature unit is marked. In another example, an ID is assigned to each feature unit. In yet another example, a mapping between each feature unit and the weights of various punctuation states of the feature unit is obtained through optimization iteration, and then the language model is established for punctuation addition. As an example, the language model stores the mapping between each feature unit and the weights of various punctuation states thereof.

According to yet another embodiment, during the process for determining the first aggregate weight, the voice file is input into a voice engine as a whole. For example, the voice engine identifies words contained in the voice file and the semantic features of each word according to an acoustic model, a dictionary and another language model for identification of the semantic features of sentences. As an example, a number of first feature units (e.g., N1) contained in the voice file are identified according to the voice engine's identification results. In another example, according to the ID of each feature unit in the first feature units, weights of various punctuation states of each feature unit are obtained from the language model established during the process for establishing the language model. In yet another example, an optimal path is calculated using a Viterbi algorithm and the first aggregate weight of various punctuation states of the voice file is determined.

According to yet another embodiment, during the process for determining the second aggregate weight, the voice file is input into a silence-detection module. For example, the silence-detection module divides the voice file into segments to be processed according to the silence detection results and delivers the paragraphs into the voice engine one by one. As an example, the voice engine identifies the words contained in the voice file and the semantic features of each word according to an acoustic model, a dictionary and another language model for the identification of the semantic features of sentences. In another example, the feature units contained in each segment are identified according to the words contained in each segment and the semantic features of each word. In yet another example, a number of second feature units (e.g., N2) contained in the voice file are determined to include an aggregation of the feature units of all segments. As an example, according to the ID of each feature unit in the second feature units, weights of various punctuation states of each feature unit are acquired from the language model established in the process for establishing the language model. In another example, an optimal path is calculated using a Viterbi algorithm and hence the second aggregate weight of various punctuation states of the voice file is acquired.

In some embodiments, after acquiring the first aggregate weight and the second aggregate weight, during the process for weighted calculation and punctuation addition, a weighted calculation is performed on the first aggregate weight and the second aggregate weight of the various punctuation states of the voice file. For example, if the first aggregate weight is R1 and the second aggregate weight is R2, a third aggregate weight R3 determined according to the following equation:

$$R_3 = a \times R_1 + (1-a) \times R_2$$

where a represents a weight coefficient satisfying 0<a<1. As an example, punctuation states that yield a largest value for the third aggregate weight R3 are selected, and punctuations are added to the voice file according to the punctuation states.

According to one embodiment, a method is provided for adding punctuations. For example, one or more first feature units are identified in a voice file taken as a whole based on at least information associated with one or more first words in the voice file and one or more first semantic features related to the first words; the voice file is divided into multiple segments based on at least information associated with a silence detection; one or more second feature units are identified in the voice file based on at least information associated with one or more second words in the segments and one or more second semantic features related to the second words; a first aggregate weight of first punctuation states of the voice file based on at least information associated with the first feature units and a second aggregate weight of second punctuation states of the voice file based on at least information associated with the second feature units are determined, using a language model established based on word separation and third semantic features: a weighted calculation is performed to generate a third aggregate weight based on at least information associated with the first aggregate weight and the second aggregate weight; and one or more final punctuations are added to the voice file based on at least information associated with the third aggregate weight. For example, the method is implemented according to at least FIG. 1, FIG. 4, and/or FIG. 5.

According to another embodiment, a system for adding punctuations includes a silence-detection module, an identification module, and a punctuation-addition module. The silence-detection module is configured to divide a voice file to be processed into multiple segments based on at least information associated with a silence detection. The identification module is configured to identify one or more first feature units in the voice file taken as a whole based on at least information associated with one or more first words in the voice file and one or more first semantic features related to the first words and identify one or more second feature units in the voice file based on at least information associated with one or more second words in the segments and one or more second semantic features related to the second words. The punctuation-addition module is configured to determine, using a language model established based on word separation and third semantic features, a first aggregate weight of first punctuation states of the voice file based on at least information associated with the first feature units and a second aggregate weight of second punctuation states of the voice file based on at least information associated with the second feature units, perform a weighted calculation to generate a third aggregate weight based on at least information associated with the first aggregate weight and the second aggregate weight, and add one or more final punctuations to the voice file based on at least information associated with the third aggregate weight. For example, the system is implemented according to at least FIG. 2, FIG. 3, and/or FIG. 6.

According to yet another embodiment, a non-transitory computer readable storage medium comprises programming instructions for adding punctuations. The programming instructions are configured to cause one or more data processors to execute the following operations. For example, one or more first feature units are identified in a voice file taken as a whole based on at least information associated with one or more first words in the voice file and one or more first semantic features related to the first words; the voice file is divided into multiple segments based on at least information associated with a silence detection; one or more second feature units are identified in the voice file based on at least information associated with one or more second words in the segments and one or more second semantic features related to the second words; a first aggregate weight of first punctuation states of the voice file based on at least information associated with the first feature units and a second aggregate weight of second punctuation states of the voice file based on at least information associated with the second feature units are determined, using a language model established based on word separation and third semantic features; a weighted calculation is performed to generate a third aggregate weight based on at least information associated with the first aggregate weight and the second aggregate weight; and one or more final punctuations are added to the voice file based on at least information associated with the third aggregate weight. For example, the storage medium is implemented according to at least FIG. 1, FIG. 4, and/or FIG. 5.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for modifying a voice file comprising a plurality of words, the method comprising:
    applying a language model to the voice file as a whole, the language model comprising a plurality of feature units, a preliminary punctuation state, and a preliminary weight of the preliminary punctuation state, each of the feature units including a word or phrase, a part of speech or sentence element of the word or phrase, the application of the language model to the voice file as a whole identifying in the voice file as a whole one or more first feature units of the plurality of feature units;
    generating a first aggregate weight R1 based on a combination of the preliminary weights of the preliminary punctuation states corresponding to the identified one or more first feature units;
    detecting silences in the voice file;
    dividing the voice file into multiple segments based on at least the detected silences;
    identifying in the segments one or more second feature units of the plurality of feature units;
    applying the language model to the segments, the application of the language model to the segments for generating a second aggregate weight R2 including a combination of the preliminary weights of the preliminary punctuation states corresponding to the identified one or more second feature units;
    generating a third aggregate weight R3 determined according to $R3=a \times R1+(1-a) \times R2$ where $0<a<1$; and
    modifying the voice file so as to include one or more final punctuations based on at least the third aggregate weight R3.

2. The method of claim 1, wherein the identification of the one or more first feature units and the identification of the one or more second feature units are performed approximately simultaneously with one another.

3. The method of claim 1, wherein:
    the voice file is processed in parallel for identifying the one or more first feature units and for identifying the one or more second feature units respectively.

4. The method of claim 1, wherein
    the one or more second feature units include an aggregation of one or more third feature units of the segments.

5. The method of claim 1, wherein the dividing the voice file into multiple segments includes:
    determining a silence threshold according to a current application scenario;
    detecting a silence duration in the voice file; and
    if the silence duration exceeds the silence threshold, generating a segment from the voice file based on at least a silence location corresponding to the silence duration.

6. The method of claim 1, further comprising establishing the language model using steps comprising:
    performing word separation to divide one or more sentences in a corpus into a plurality of words, the sentences in the corpus including one or more preliminary punctuations;
    searching for one or more third feature units in the corpus according to a predetermined feature template based on semantic features of the words in the corpus; and
    for a particular third feature unit including a word or phrase in the corpus:
        recording a number of occurrences of the preliminary punctuation state associated with the word or phrase of that particular third feature unit;

determining the preliminary weight of that preliminary punctuation state based on at least the recorded number of occurrences; and mapping the particular third feature unit to the preliminary weight of that preliminary punctuation state.

7. The method of claim 1, wherein:

at least one of the one or more first feature units or at least one of the one or more of the second feature units includes a single-word feature unit, the single-word feature unit being acquired based on at least a single-word feature template;

the single-word feature template includes a word satisfying a predetermined relative-position relationship with a present reference position and one or more semantic features of the word;

the acquisition of the single-word feature unit includes:
 selecting a position of another word as the present reference position;
 determining the word satisfying the predetermined relative-position relationship with the present reference position; and
 identifying the single-word feature unit based on at least: the one or more semantic features, the single-word feature unit, and the predetermined relative-position relationship between the word and the present reference position.

8. The method of claim 1, wherein:

at least one of the one or more first feature units or at least one of the one or more second feature units includes a multi-word feature unit, the multi-word feature unit being acquired based on at least a multi-word feature template;

the multi-word feature template includes acquisition of multiple words satisfying a predetermined relative-position relationship with a present reference position and one or more semantic features of the words;

the acquisition of the multi-word feature unit includes:
 selecting a position of another word as the present reference position;
 determining the words satisfying the predetermined relative-position relationship with the present reference position; and
 identifying the multi-word feature unit based on at least: the one or more semantic features, the multi-word feature unit, and the predetermined relative-position relationship between the words and the present reference position.

9. The method of claim 1, wherein:

determining the first aggregate weight R1 includes:
 acquiring from the language model a mapping between the one or more first feature units and one or more of the preliminary weights for one or more of the preliminary punctuation states associated with the one or more first feature units;
 determining one or more word weights related to the one or more preliminary punctuation states based on at least the mapping; and
 calculating the first aggregate weight R1 based on at least the word weights.

10. The method of claim 1, wherein:

determining the second aggregate weight R2 includes:
 acquiring from the language model a mapping between the one or more second feature units and one or more of the preliminary weights for one or more of the preliminary punctuation states associated with the one or more second feature units;
 determining one or more word weights related to the one or more preliminary punctuation states based on at least the mapping; and
 calculating the second aggregate weight R2 based on at least the word weights.

11. A system for modifying a voice file comprising a plurality of words, the system comprising:

a silence-detection module configured to detect silences in the voice file and to divide the voice file into multiple segments based on at least the detected silences, an identification module configured to:
 apply a language model to the voice file as a whole, the language model including a plurality of feature units, a preliminary punctuation state, and a preliminary weight of the preliminary punctuation state, each of the feature units including a word or phrase, a part of speech or sentence element of the word or phrase, the application of the language model to the voice file as a whole identifying in the voice file as a whole one or more first feature units of the plurality of feature units; and
 identifying in the segments one or more second feature units of the plurality of feature units;

and a punctuation-addition module configured to:
 generate a first aggregate weight R1 based on a combination of the preliminary weights of the preliminary punctuation states corresponding to the identified one or more first feature units;
 apply the language model to the segments, the application of the language model to the segments to generate a second aggregate weight R2 including a combination of the preliminary weights of the preliminary punctuation states corresponding to the identified one or more second feature units;
 generate a third aggregate weight R3 determined according to $R3 = a \times R1 + (1-a) \times R2$ where $0 < a < 1$; and
 modifying the voice file so as to include one or more final punctuations based on at least the third aggregate weight R3.

12. The system of claim 11, wherein the punctuation-addition module includes:

an aggregate-weight-determination component configured to determine the first aggregate weight R1 and the second aggregate weight R2;

an aggregate-weight-integration component configured to generate the third aggregate weight R3; and a punctuation-addition component configured to modify the voice file.

13. The system of claim 12, wherein the aggregate-weight-determination component is further configured to:

acquire from the language model a mapping between the one or more first feature units and one or more of the preliminary weights for one or more of the preliminary punctuation states associated with the one or more first feature units;

determine one or more word weights related to the one or more preliminary punctuation states based on at least the mapping; and calculate the first aggregate weight R1 based on at least the word weights.

14. The system of claim 12, wherein the aggregate-weight-determination component is further configured to:

acquire from the language model a mapping between the one or more second feature units and one or more of the preliminary weights for one or more of the preliminary punctuation states associated with the one or more second feature units;

determine one or more word weights related to the one or more preliminary punctuation states based on at least the mapping; and
calculate the second aggregate weight R2 based on at least the second word weights.

15. The system of claim 11 wherein the identification module is further configured to identify the one or more first feature units and the one or more second feature units approximately simultaneously with one another.

16. The system of claim 11, further comprising:
a first input module coupled to the identification module and configured to provide the voice file as a whole to the identification module; and
a second input module coupled to the silence-detection module and configured to provide the voice file to the silence-detection module, the silence-detection module being further configured to provide the segments of the voice file to the identification module.

17. The system of claim 11 wherein the one or more second feature units include an aggregation of one or more third feature units of the segments.

18. The system of claim 11 wherein the silence-detection module is further configured to:
determine a silence threshold according to a current application scenario,
detect a silence duration in the voice file, and
if the silence duration exceeds the silence threshold, generate a segment from the voice file based on at least a silence location corresponding to the silence duration.

19. The system of claim 11, being further configured, for establishing the language model, to:
perform word separation to divide one or more sentences in a corpus into a plurality of words, the sentences in the corpus including one or more preliminary punctuations;
search for one or more third feature units in the corpus according to a predetermined feature template based on semantic features of the words in the corpus;
for a particular third feature unit including a word or phrase in the corpus:
record a number of occurrences of the preliminary punctuation state associated with the word or phrase of that particular third feature unit;
determine the preliminary weight of that preliminary punctuation state based on at least the recorded number of occurrences; and
mapping the particular third feature unit to the preliminary weight of that preliminary punctuation state.

20. The system of claim 11, wherein:
at least one of the one or more first feature units or at least one of the one or more second feature units includes a single-word feature unit, the single-word feature unit being associated with a single-word feature template including a word satisfying a predetermined relative-position relationship with a present reference position and one or more semantic features of the word;
the identification module is further configured to:
select a position of another word as the present reference position;
determine the word satisfying the predetermined relative-position relationship with the present reference position; and
identify the single-word feature unit based on at least: the one or more semantic features, the single-word feature unit, and the predetermined relative-position relationship between the word and the present reference position.

21. The system of claim 11, wherein:
at least one of the one or more first feature units or at least one of the one or more second feature units includes a multi-word feature unit, the multi-word feature unit being associated with a multi-word feature template including acquisition of multiple words satisfying a predetermined relative-position relationship with a present reference position and one or more semantic features of the words;
the identification module is further configured to:
select a position of another word as the present reference position;
determine the words satisfying the predetermined relative-position relationship with the present reference position; and
identify the multi-word feature unit based on at least: the one or more semantic features, the multi-word feature unit, and the predetermined relative-position relationship between the words and the present reference position.

22. The system of claim 11, further comprising:
one or more data processors; and
a computer-readable storage medium;
wherein the silence-detection module, the identification module, and the punctuation-addition module each are stored in the storage medium and configured to be executed by the one or more data processors.

23. A non-transitory computer readable storage medium comprising programming instructions for modifying a voice file comprising a plurality of words, the programming instructions configured to cause one or more data processors to execute operations comprising:
applying a language model to the voice file as a whole, the language model comprising a plurality of feature units, a preliminary punctuation state, and a preliminary weight of the preliminary punctuation state, each of the feature units including a word or phrase, a part of speech or sentence element of the word or phrase, the application of the language model to the voice file as a whole identifying in the voice file as a whole one or more first feature units of the plurality of feature units;
generating a first aggregate weight R1 based on a combination of the preliminary weights of the preliminary punctuation states corresponding to the identified one or more first feature units;
detecting silences in the voice file;
dividing the voice file into multiple segments based on at least the detected silences;
identifying in the segments one or more second feature units of the plurality of feature units;
applying the language model to the segments, the application of the language model to the segments for generating a second aggregate weight R2 including a combination of the preliminary weights of the preliminary punctuation states corresponding to the identified one or more second feature units;
generating a third aggregate weight R3 determined according to $R3 = a \times R1 + (1-a) \times R2$ where $0 < a < 1$; and
modifying the voice file so as to include one or more final punctuations based on at least the third aggregate weight R3.

* * * * *